United States Patent
Itskovich (10) Patent No.: US 7,150,316 B2
(45) Date of Patent: Dec. 19, 2006

(54) METHOD OF ELIMINATING CONDUCTIVE DRILL PARASITIC INFLUENCE ON THE MEASUREMENTS OF TRANSIENT ELECTROMAGNETIC COMPONENTS IN MWD TOOLS

(75) Inventor: Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 350 days.

(21) Appl. No.: 10/771,868

(22) Filed: Feb. 4, 2004

(65) Prior Publication Data

US 2005/0167100 A1   Aug. 4, 2005

(51) Int. Cl.
*E21B 43/00* (2006.01)
(52) U.S. Cl. .................................... 166/248; 166/65.1
(58) Field of Classification Search ................ 166/248, 166/65.1; 324/303, 348, 338, 339
See application file for complete search history.

(56) References Cited

U.S. PATENT DOCUMENTS

| | | | |
|---|---|---|---|
| 5,452,761 A | 9/1995 | Beard et al. ................. 166/250 |
| 5,530,358 A * | 6/1996 | Wisler et al. ................ 324/338 |
| 5,530,359 A | 6/1996 | Habashy et al. ............. 324/338 |
| 5,710,511 A * | 1/1998 | Taicher et al. ............... 324/303 |
| 5,955,884 A | 9/1999 | Payton et al. ................ 324/339 |
| 6,188,222 B1 | 2/2001 | Seydoux et al. ............. 324/339 |
| 6,900,640 B1 * | 5/2005 | Fanini et al. ................ 324/339 |
| 2003/0155915 A1* | 8/2003 | Kruspe et al. ............... 324/303 |
| 2005/0049792 A1* | 3/2005 | Yu et al. ......................... 702/7 |

* cited by examiner

*Primary Examiner*—Frank Tsay
(74) *Attorney, Agent, or Firm*—Madan, Mossman & Sriram, P.C.

(57) ABSTRACT

A transmitter on a bottomhole assembly (BHA) is used for generating a transient electromagnetic signal in an earth formation. A receiver on the BHA receives signals that are indicative of formation resistivity and distances to bed boundaries. The transmitter and receiver may have axes that are parallel to or inclined to the axis of the BHA. The transmitter and the receiver are on a tubular on a damping portion of the BHA that includes cuts for attenuating eddy currents. The damping portion may include non conducting material such as a ferrite on the outer surface.

32 Claims, 10 Drawing Sheets

METHOD OF ELIMINATING CONDUCTIVE DRILL PARASITIC INFLUENCE ON THE MEASUREMENTS OF TRANSIENT ELECTROMAGNETIC COMPONENTS IN MWD TOOLS

BACKGROUND OF THE INVENTION

1. Field of the Invention

The invention relates to the field of electromagnetic induction well logging. More specifically, the present invention is a method of reducing effects of conductive drill pipes on resistive signals in transient electromagnetic phenomena.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

At the ultra-deep scale, technology may be employed based on transient field behavior. The transient electromagnetic field method is widely used in surface geophysics. Examples of transient technology are seen, for example, in Kaufman et al., 1983, "Frequency and transient soundings", Elsevier Science.; Sidorov et al., 1969, "Geophysical surveys with near zone transient EM." published by NVIGG, Saratov, Russia; and Rabinovich et al., 1981, "Formation of an immersed vertical magnetic dipole field": *J. Geologiya I Geofizika*, N 3. Typically, voltage or current pulses that are excited in a transmitter initiate the propagation of an electromagnetic signal in the earth formation. Electric currents diffuse outwards from the transmitter into the surrounding formation. At different times, information arrives at the measurement sensor from different investigation depths. Particularly, at a sufficiently late time, the transient electromagnetic field is sensitive only to remote formation zones and does not depend on the resistivity distribution in the vicinity of the transmitter (see Kaufman et al., 1983). This transient field is especially important for logging. Use of a symmetric logging tool using transient field measurements for formation detection is discussed, for example, in U.S. Pat. No. 5,530,359, issued to Habashy et al.

U.S. Pat. No. 5,955,884, issued to Payton et al. discusses methods for measuring transient electromagnetic fields in rock formations. Electromagnetic energy is applied to the formation at selected frequencies and waveforms that maximize the radial depth of penetration of the magnetic and electric energy. Payton comprises at least one electromagnetic transmitter and at least one electric transmitter for applying electric energy. The transmitter may be either a single-axis or multi-axis electromagnetic and/or electric transmitter. In one embodiment the TEM transmitters and TEM receivers are separate modules that are spaced apart and interconnected by lengths of cable, with the TEM transmitter and TEM receiver modules being separated by an interval of from one meter up to 200 meters, as selected. Radial depth of investigation is related to the skin depth $\delta = \sqrt{2/\sigma\mu\omega}$ which in turn is related to frequency. Lower frequency signals can increase the skin depth. Similarly, the conductivity of the surrounding material inversely affects the skin depth. As conductivity increases, the depth of investigation decreases. Finite conductivity casing of the apparatus therefore can reduce the depth of investigation.

Rapidly emerging measurement-while-drilling (MWD) technology introduces a new, meso-deep (3–10 meters) scale for an electromagnetic logging application related to well navigation in thick reservoirs. The major problem associated with the MWD environment is the introduction of a metal drill pipe close to the area being measured. This pipe produces a very strong response and significantly reduces the sensitivity of the measured EM field to the effects of formation resistivities and remote boundaries. Previous solutions for this problem typically comprise creating a large spacing (up to 20 meters) between transmitter and receiver (as discussed in U.S. Pat. No. 6,188,222 B1, issued to Seydoux et al.). The sensitivity of such a tool to remote boundaries is low. Currently, Stolar Horizon, Inc. is developing drill string radar, DSR, for CBM (Coal Bed Methane) wells. DSR provides 3-D imaging within a close range of the wellbore.

Currently, induction tools operate to obtain measurements in the presence of a primary field. In measurement-while-drilling method, examples of such techniques are the Multiple Propagation Resistivity (MPR) device, and the High-Definition Induction Logging (HDIL) device for open hole. One or more transmitters disposed along a drill tool act as a primary source of induction and signals are received from the formation at receiver coils placed at an axial distance from the transmitters along the drill tool. A disadvantage of both MPR and HDIL methods is that the primary source of induction from the transmitter is always present during the time frame in which the receivers are obtaining measurements from the formation, thereby distorting the intended signal. This can be solved by using pulse excitations such as is done in a transient induction tool where signals are measured during time intervals between excitation pulses.

In a typical transient induction tool, current in the transmitter coil drops from its initial value $I_0$ to 0 at the moment $t=0$. Subsequent measurements are taken while the rotating tool is moving along the borehole trajectory. The currents induced in the drilling pipe and in the formation (i.e. eddy currents) begin diffusing from the region close to the transmitter coil in all the directions surrounding the transmitter. These currents induce electromagnetic field components which can be measured by induction coils placed along the conductive pipe. Signal contributions due to the eddy currents in the pipe are considered to be parasitic since the signal due to these currents is much stronger than the signal from the formation. In order to receive a signal which is substantially unaffected by the eddy currents in the pipe, one can measure the signal at the very late stage, at a time in which the signals from the formation dominate parasitic signals due to the pipe. Although the formation signal dominates at the late stage, it is also very small, and reliable measurement can be difficult. In prior methods, increasing the distance between transmitter and receivers reduces the influence of the pipe and shifts dominant contribution of the formation to the earlier time range. Besides having limited resolution with respect to an oil/water boundary, such a system is very long (up to 10–15 m) which is not desirable and convenient for an MWD tool.

There is a need to reduce the parasitic signals cause by eddy currents in transient field signal detection methods without increasing a distance between transmitter and receiver. The present invention fulfills that need.

SUMMARY OF THE INVENTION

The present invention is an apparatus for use in a borehole in an earth formation. A tubular portion of the apparatus includes a damping portion for interrupting a flow of eddy currents. A transmitter positioned within said damping portion propagates an electromagnetic signal in the earth formation. A receiver positioned within the damping portion axially separated from said transmitter receives a transient signal indicative of resistivity properties of the formation. A processor determines from the first and second signals a resistivity of the earth formation. The damping portion includes at least one cut that may be longitudinal or azimuthal. A non-conductive material may be disposed within the cut. Alternatively, the damping portion may include segments having cuts and segments having a non-conducting material on the outer surface.

The transmitter and receivers may be in arrays and may have a coil oriented with an axis that is parallel to a longitudinal axis of the BHA or may be inclined to the longitudinal axis.

The processor may further determine a distance to a bed boundary in said earth formation from the measurements.

BRIEF DESCRIPTION OF THE DRAWINGS

The present invention is best understood with reference to the attached drawings in which like numerals refer to like elements, and in which.

DESCRIPTION OF PREFERRED EMBODIMENT

Figure 1:
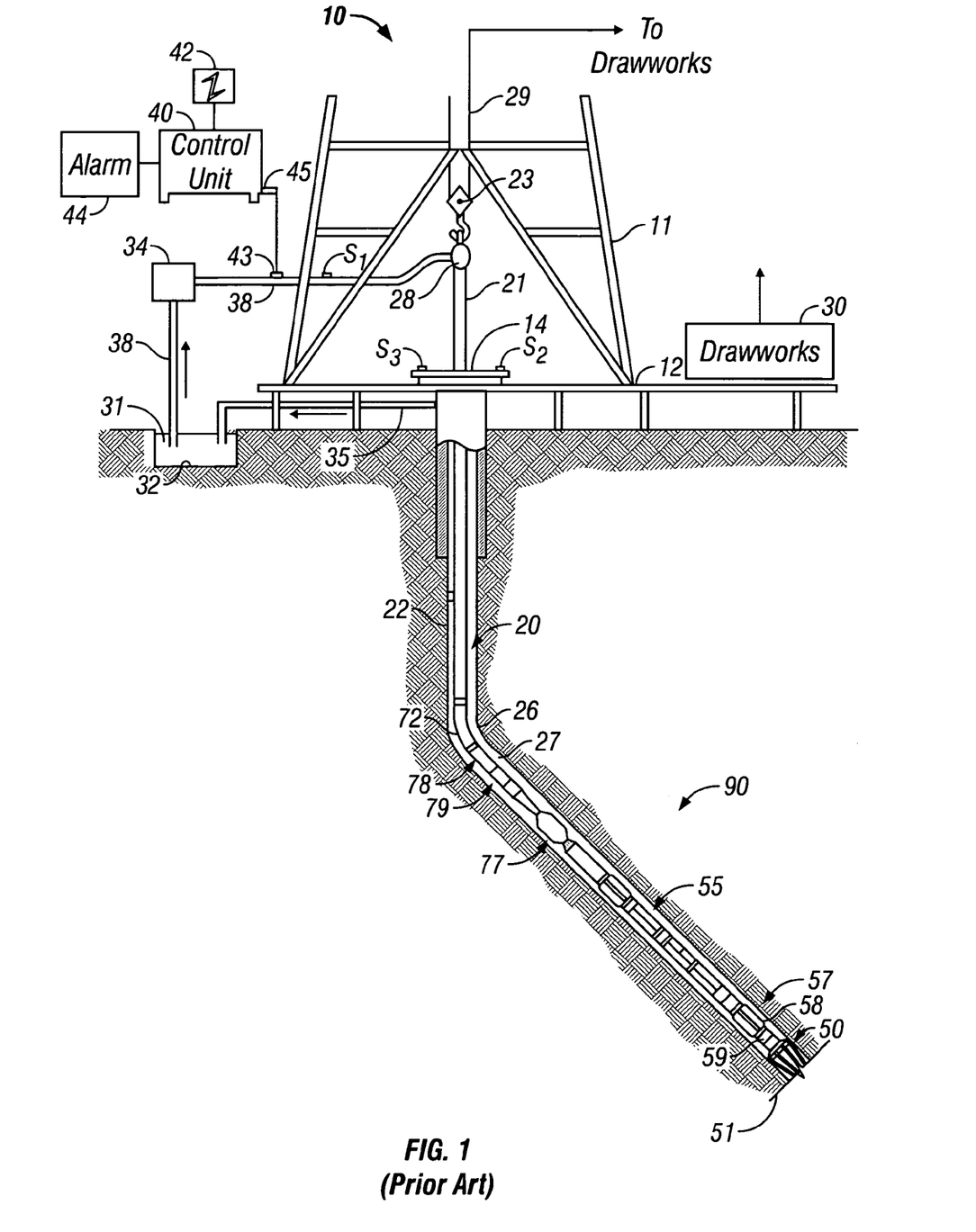
FIG. 1 shows a measurement-while-drilling tool suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
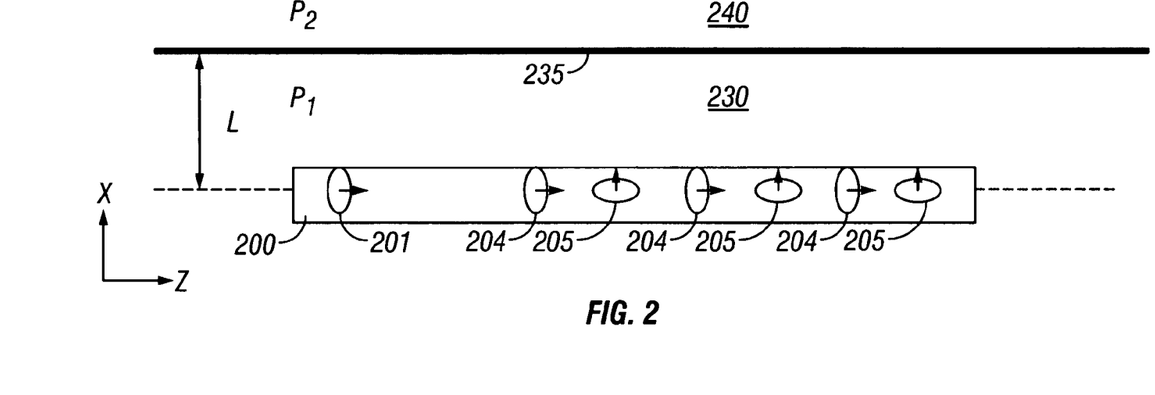
FIG. 2 shows a schematic of the tool and its trajectory in the horizontal well.

FIG. 2 shows an apparatus of the present invention. A transmitter coil 201 and a receiver coil assembly are positioned along a damping portion 200 of drill pipe for suppressing an eddy current. The longitudinal axis of the drill tool defines a Z-direction of a coordinate system. An X-direction is defined so as to be perpendicular to the longitudinal axis of the drill tool. Damping portion 200 of the drill pipe is of length sufficient to interrupt a flow of eddy currents. Transmitter coil 201 induces a magnetic moment. In the illustration of FIG. 2, for instance, the transmitter coil 201 is oriented to induce a magnetic moment along the Z-direction. The receiver coil assembly comprises an array of Z-oriented 204 and X-oriented 205 coils having magnetic moments oriented so as to detect induced magnetic moments along orthogonal directions (i.e., $M_x$, $M_z$). With a conductive pipe without a damping portion, eddy currents produced in transient field measurements can make circumferential circuits coinciding with the pipe surface. The eddy currents produced from a Z-transmitter can live for a long time and typically have the longest possible rate of decay of all signals. Longitudinal cuts force the eddy currents to follow high resistivity path instead of circumferential circuits, thereby inducing a quicker rate of decay of the eddy currents. Inducing a fast decay of the eddy currents in the pipe enables improved measurements of the transient electromagnetic components. Such improvements enable improved determination of information, for instance, about positions of oil/water boundaries and resistivity of the surrounding formation.

Although FIG. 2 illustrates one configuration of transmitter and receiver, a variety of transmitter receiver configurations can be used in the present invention. In a first embodiment of the MWD transient tool, a Z-directed transmitter coil can be positioned along the damping portion, and a receiver coil pair comprising an X-directed a Z-directed receiver coil pair is axially displaced from the Z-directed transmitter coil. The receiver pair is typically placed at a distance of from 0 m to 10 m from the transmitter, also on the damping portion. A transmitter-receiver distance less than approximately 2 m from the transmitter further enables geosteering. The term geosteering refers to control of the drilling direction of the BHA based upon determined distances from an interface in the earth formation. Typically, in geosteering, it is desired to maintain the drilling of the borehole at a desired depth below a fluid interface such as an oil/water, gas/oil or gas/water interface. Alternatively, geosteering may be used to maintain the wellbore within a reservoir rock at a desired distance from the caprock.

The damping portion of the pipe of the embodiment has longitudinal cuts of sufficient length to interrupt flow of current, in this case, about 10 m in length. The transmitter-receiver pair is placed centrally in the damping portion of the pipe.

In a second embodiment, the MWD transient tool comprises an X-directed transmitter coil, with the same X-directed coil being used as a receiver and a Z-directed receiver coil axially displaced at the distance less than 2 m from the X-directed transmitter coil also being used as a receiver. Longitudinal cuts can typically extend approximately 10 m along the cut portion of the pipe. A transmitter-receiver distance of less than approximately 2 m from the transmitter further enables geosteering. The transmitter-receiver pair is located centrally in the damping portion of the pipe. In a third embodiment of the MWD transient tool, a Z-directed transmitter coil can be placed along the pipe, and an array of X-directed and Z-directed coil can be axially displaced along the damping portion of the pipe at a distance of from 0 m to 10 m from the transmitter coil. The cut portion typically comprises longitudinal and azimuthal cuts and extends approximately from 10 m to 20 m in length. The cuts are filled with a non-conductive material to further suppress eddy currents. The array can extend, for instance, up to a distance of 10 m from the transmitter.

In a fourth embodiment of the MWD transient tool, a Z-directed transmitter coil and an array of X- and Z-directed coils can be placed along the damping portion of the pipe at a distance of from 0 m to 10 m from the transmitter coil. The damping portion can typically extend from 10 to 20 m in length with receiver array extending a distance up to approximately 10 m from the transmitter.

Additionally, the damping portion of the pipe can further comprise a combination of cuts in the pipe and magnetic material with high magnetic permeability covering the pipe. For example, a periodic sequence of pipe elements can be made in which, for example, a first 1 m of the pipe has cuts and the next 1 m of the pipe is covered by magnetic material. This 2 m long pipe-element can be repeated. A typical number of repetitions can be, for example, 10 times. Also, the damping portion can comprise only a magnetic covering to enable suppression of an eddy current signal.

The drilling tool 200 of FIG. 2 lies horizontally disposed within a formation 230 having resistivity $\rho_1$ and positioned at a distance L from a boundary between formation 230 and formation 240 having resistivity $\rho_2$. In a homogeneous full-space horizontal well the X-component is the only component that is non-zero. In the horizontally layered structure, as shown in FIG. 2, both the X- and Z-components are non-zero.

Figure 3:
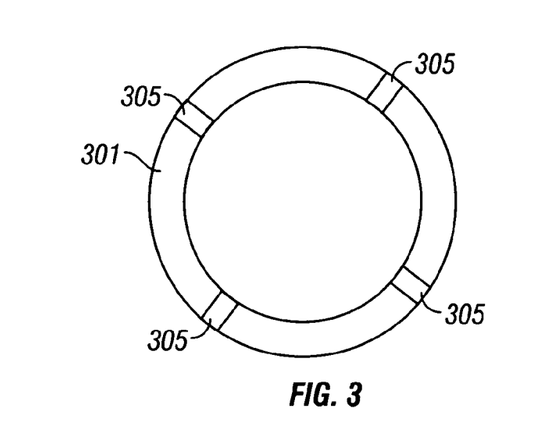
FIG. 3 shows a cross-section of the pipe with longitudinal cuts.
Figure 4:
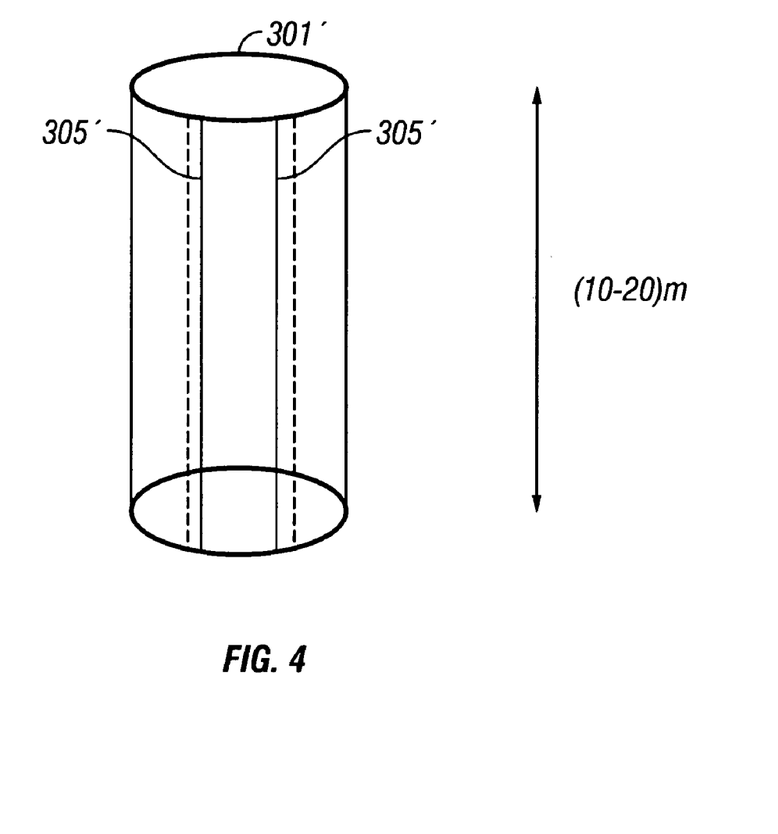
FIG. 4 shows a side view of the pipe with longitudinal cuts.

FIG. 3 shows a cross-section of the damping portion 200 of the drill pipe with longitudinal cuts in an exemplary embodiment of the present invention. Conductive pipe 301 is segmented by a plurality of cuts 305. The cuts 305 are typically filled with a non-conductive material. FIG. 4 shows a side view of the pipe 301' with longitudinal cuts 305' more fully displayed. Although a suppression of circumferential eddy currents can be achieved with one longitudinal cut, a plurality of longitudinal cuts 305' is typically employed so as to further suppress eddy currents. Alternatively, the direction of the cuts can be chosen so as to correspond to the geometry of the eddy currents in the pipe. For instance, with an embodiment using a Z-transmitter, longitudinal cuts provide a maximal suppression. Such longitudinal cuts can extend, for example ~10–20 m in length. In an embodiment using a X-transmitter, a combination of longitudinal and azimuthal cuts can be used to provide a maximal suppression.

Figure 5:
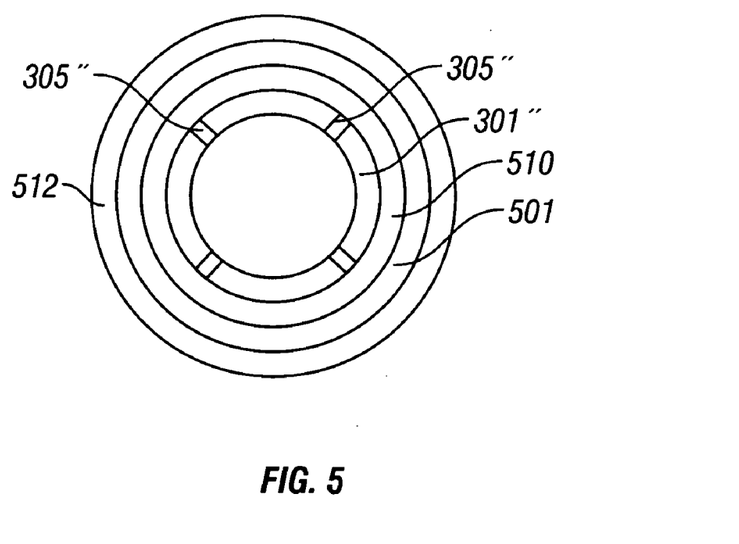
FIG. 5 shows a cross-section of the tool with longitudinal cuts.

FIG. 5 shows a cross-section of the tool with the damping portion of the pipe of FIG. 3 encased within. Pipe 301" with cuts 305" is surrounded on its outer diameter by a non-conducting material 510. The non-conductive material 510 can be magnetic, for example. A Z-directed transmitter 501 is disposed around the non-conductive material 510, and a second non-conductive material layer 512 is found at the outer diameter of the transmitter coil 501. The insertion of magnetic material between the source of magnetic induction and the region of interest can reduce the magnetic induction and, consequently, the eddy currents in the region of interest.

FIGS. 6A–B, 7A–B, 8A–B, and 9A–B illustrate the high-resolution capabilities of the transient MWD tool of the present invention. Mathematical modeling results are shown from a two-layered formation such as shown in FIG. 2. A Z-directed transmitter and Z- and X-directed receivers are used to obtain the curves of these figures. An X-orientation of the transmitter can give a resolution similar to that of a Z-oriented transmitter concerning detection of an oil/water boundary. A series of longitudinal and azimuthal cuts in the pipe are made to suppress eddy currents. The modeling results assume that the pipe is nonconducting. The tool is as in FIG. 2, in a placed in a first layer 230, having resistivity $\rho_1$=50 ohm-m. The second layer 240 is located at distances ranging from 1 to 11 meters from the tool. Resistivity of the second layer is $\rho_2$=2 ohm-m. Measurements are typically made during the 1–100 μsec time interval after the application of the signal from the primary source. When an X-transmitter is use, typically the Z-direction receiver component measurements are use for azimuthal resolution while distance to the boundary and resistivity of the formation is obtained from the X-component measurements. When a Z-transmitter is use, typically the X-direction receiver component measurements are use for azimuthal resolution while distance to the boundary and resistivity of the formation is obtained from the Z-component measurements.

Figure 6A:
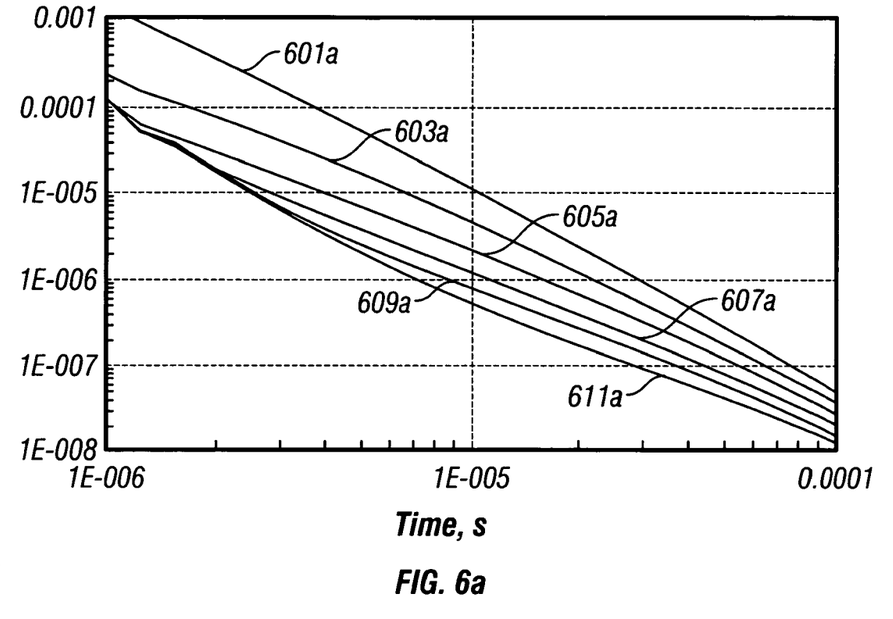
FIGS. 6A–B, shows modeling results representing transient responses for Z and X oriented receivers at a distance of 0.2 m from a transmitter.
Figure 6B:
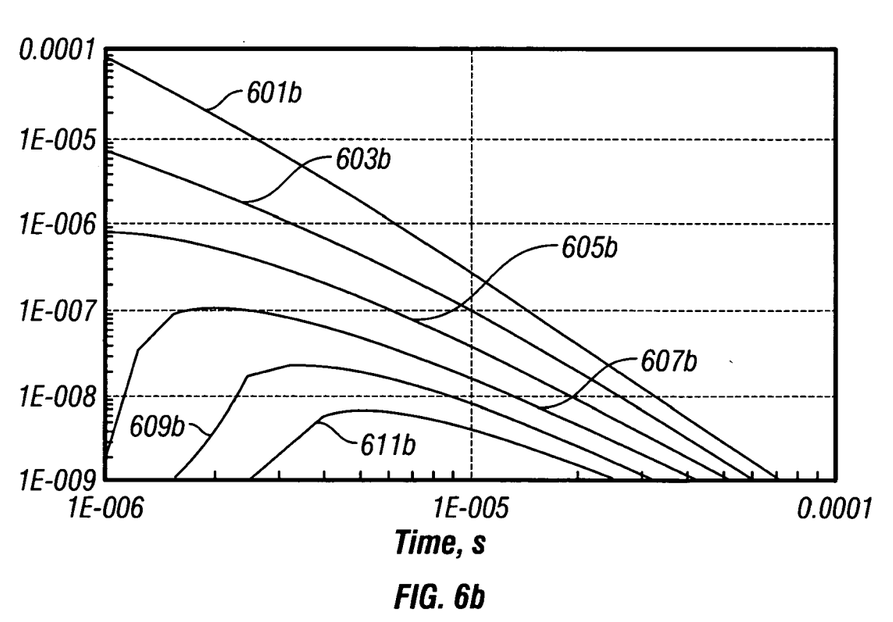

FIGS. 6A and 6B show both Z- and X-components, respectively, obtained at a transmitter-receiver spacing of 0.2 m. Curve 601a represents the response of the tool placed at a distance of 1 m from the formation boundary. Curves 603a, 605a, 607a, 609a, and 611a further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$. In FIG. 6B, Curve 601b represents a response of a tool at a distance of 1 m from the formation boundary. Curves 603b, 605b, 607b, 609b, and 611b further represent responses at a distance of 3 m, 5 m, 7 m, 9 m and 11 m, respectively. Time is plotted in units of seconds along the abscissa and $dB_x/dt$ is plotted along the ordinate in units of $V/(Am^4)$.

The X-component of FIG. 6B has superior resolution compared to the Z-component, (FIG. 6A). Maximum sensitivity to the bed boundary is found at the early times (times less than 5 μsec). At 0.2 m transmitter-receiver spacing, for the models in which the depth-to-boundary is more than 5 m, the signal value of the X-component is several orders of magnitude less than the signal value of the Z-component, thereby reducing a reliability of measurements in the Z direction. Increasing the spacing between the receiver and the transmitter improves the ratio between X- and Z-directed components of the signal. FIGS. 7A–B, FIGS. 8A–B, and FIGS. 9A–B presents modeling results for transmitter-receiver spacing of 2 m, 6 m, and 12 m, correspondingly.

Figure 7A:
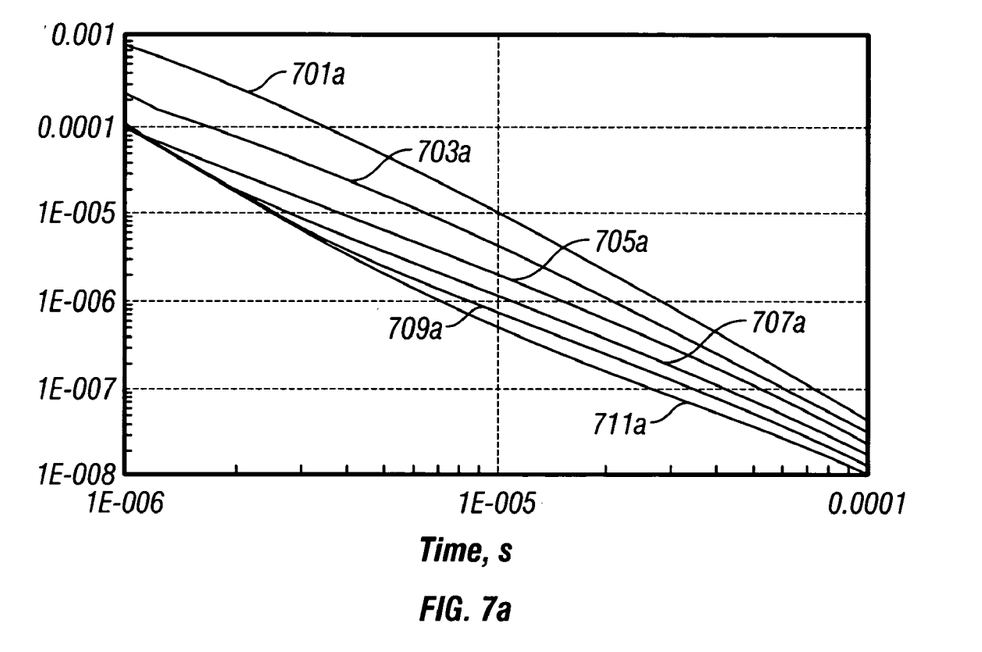
FIG. 7A–B, shows modeling results representing transient responses for Z and X oriented receivers at a distance of 2 m from a transmitter.
Figure 7B:
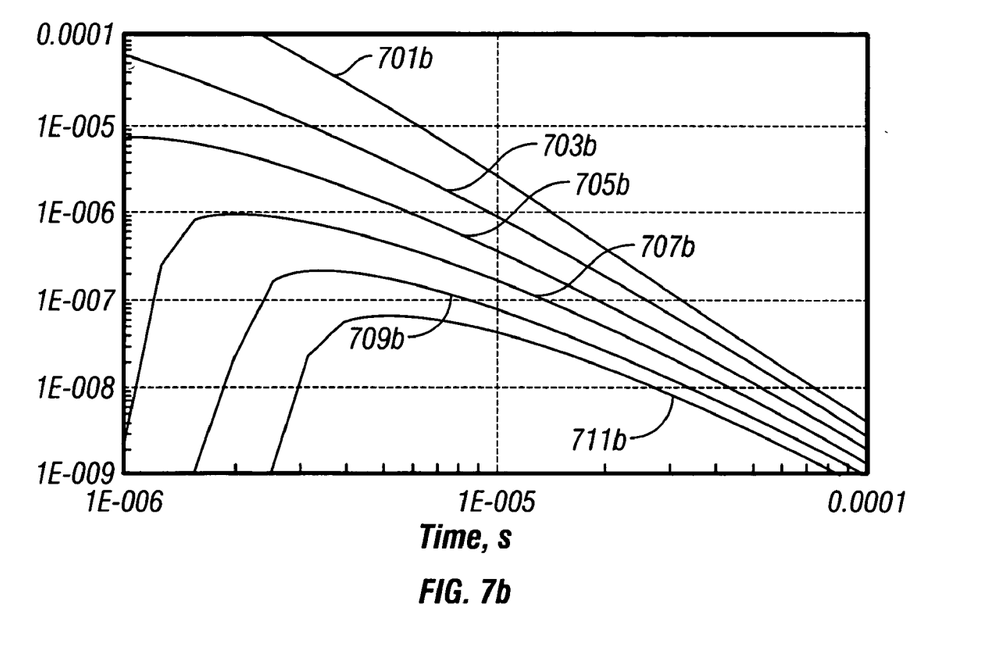

FIG. 7 shows both Z- and X-components, respectively, obtained at a transmitter-receiver spacing of 2 m. Curve 701a represents a response of a tool at a distance of 1 m from the formation boundary. Curves 703a, 705a, 707a, 709a, and 711a further represent responses at a distance of 3 m, 5 m, 7 m, 9 m and 11 m, respectively. Time is plotted in units of seconds along the abscissa and $dB_z/dt$ is plotted along the ordinate in units of $V/(Am^4)$. In FIG. 7b, Curve 701b represents a response of a tool at a distance of 1m from the formation boundary. Curves 703b, 705b, 707b, 709b, and 711b further represent responses at a distance of 3 m, 5 m, 7 m, 9 m and 11 m, respectively. Curve 720b represents a response obtained at an infinite distance away from the formation boundary. Time is plotted in units of seconds along the abscissa and $dB_x/dt$ is plotted along the ordinate in units of $V/(Am^4)$.

Figure 8A:
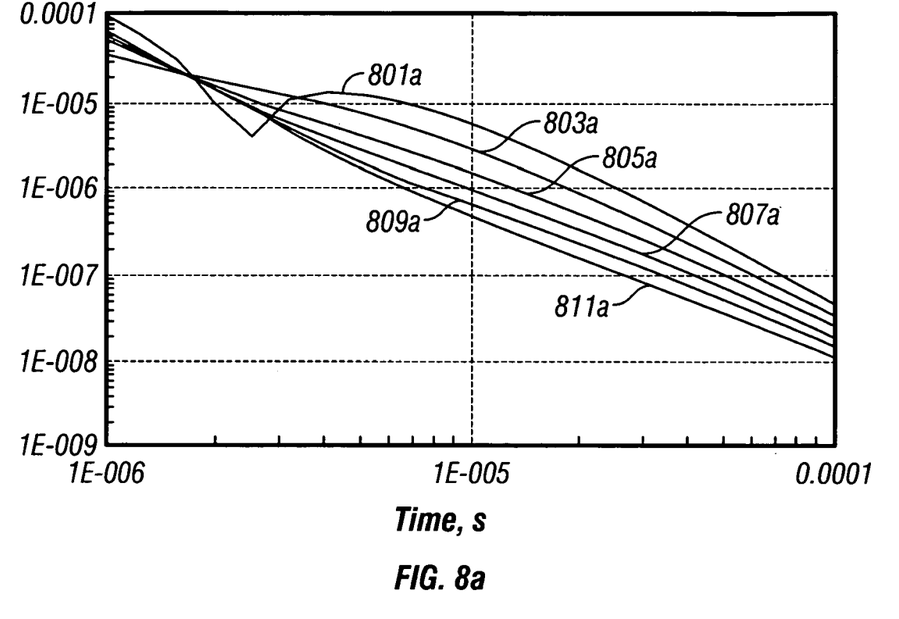
FIG. 8A–B shows modeling results representing transient responses for Z and X oriented receivers at a distance of 6 m from a transmitter.
Figure 8B:
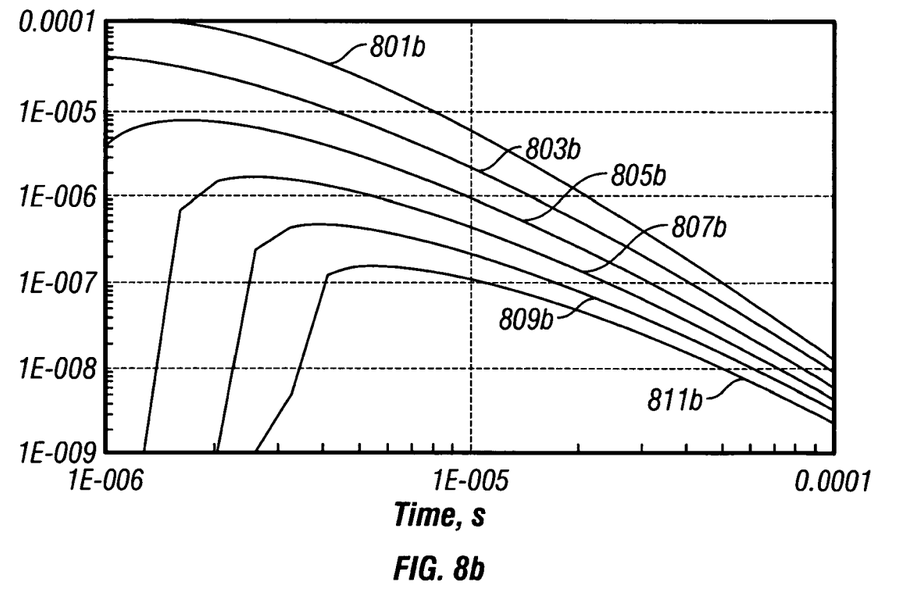

FIG. 8 shows both Z- and X-components, respectively, obtained at a transmitter-receiver spacing of 6 m. Curve 801a represents a response of a tool at a distance of 1 m from the formation boundary. Curves 803a, 805a, 807a, 809a, and 811a further represent responses at a distance of 3 m, 5 m, 7 m, 9 m and 11 m, respectively. Curve 820a represents a response obtained at an infinite distance away from the formation boundary. Time is plotted in units of seconds along the abscissa and $dB_z/dt$ is plotted along the ordinate in units of $V/(Am^4)$. In FIG. 8b, Curve 801b represents a response of a tool at a distance of 1m from the formation boundary. Curves 803b, 805b, 807b, 809b, and 811b further represent responses at a distance of 3 m, 5 m, 7 m, 9 m and 11 m, respectively. Time is plotted in units of seconds along the abscissa and $dB_x/dt$ is plotted along the ordinate in units of $V/(Am^4)$.

Figure 9A:
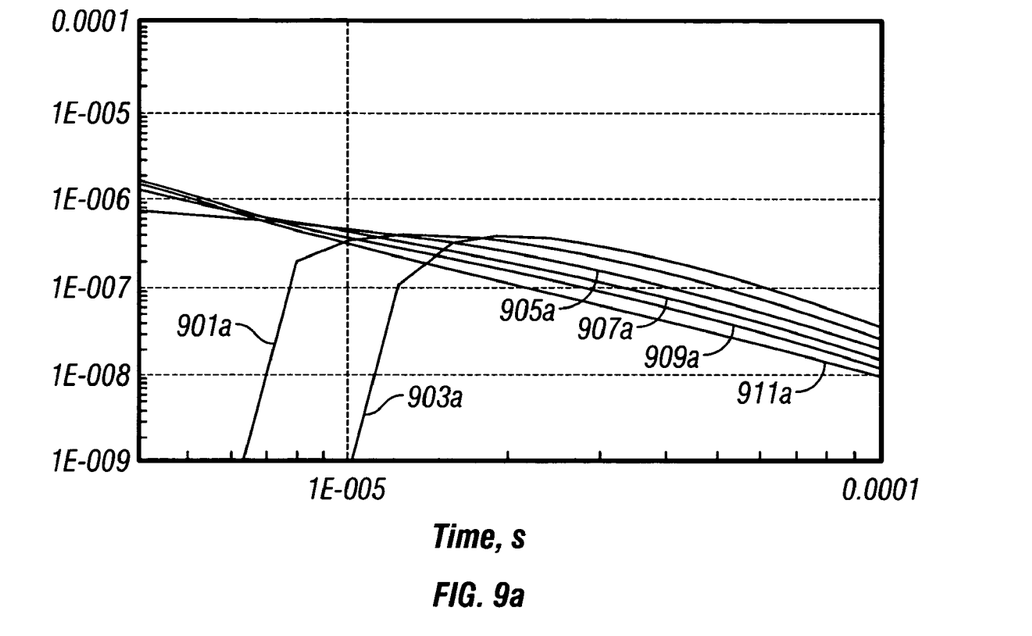
FIG. 9A–B shows modeling results representing transient responses for Z and X oriented receivers at a distance of 12 m from a transmitter.
Figure 9B:
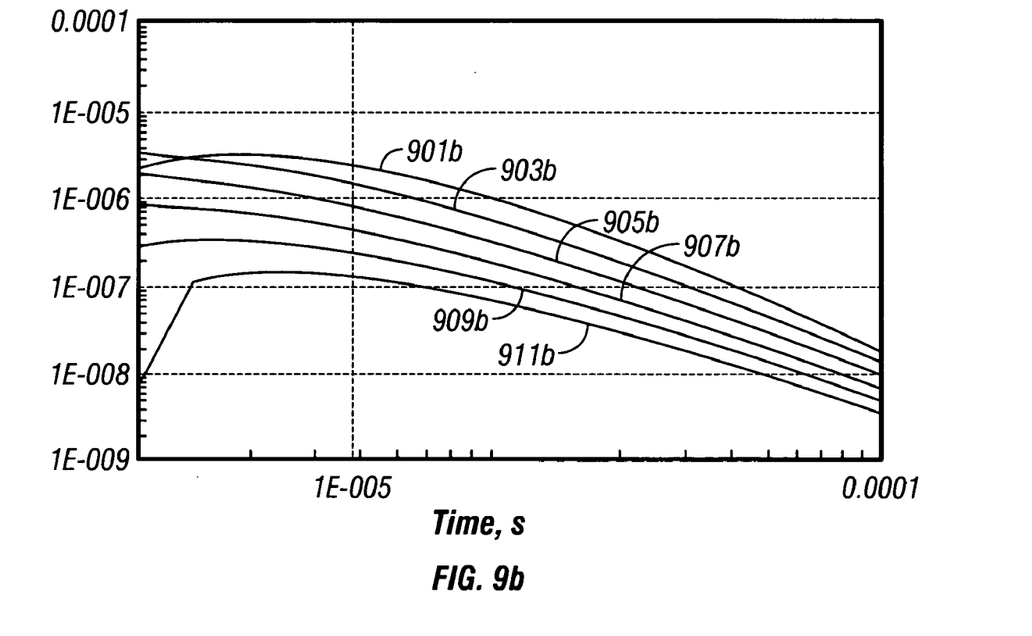

FIG. 9 shows both Z- and X-components, respectively, obtained at a transmitter-receiver spacing of 12 m. Curve 901a represents a response of a tool at a distance of 1 m from the formation boundary. Curves 903a, 905a, 907a, 909a, and 911a further represent responses at a distance of 3 m, 5 m, 7 m, 9 m and 11 m, respectively. Curve 920a represents a response obtained at an infinite distance away from the formation boundary. Time is plotted in units of seconds along the abscissa and $dB_z/dt$ is plotted along the ordinate in units of $V/(Am^4)$. In FIG. 9b, Curve 901b represents a response of a tool at a distance of 1 m from the formation boundary. Curves 903b, 905b, 907b, 909b, and 911b further represent responses at a distance of 3 m, 5 m, 7 m, 9 m and 11 m, respectively. Time is plotted in units of seconds along the abscissa and $dB_x/dt$ is plotted along the ordinate in units of $V/(Am^4)$.

Methods as described above are analyzed first to define which X-component measurements should be eliminated from the quantitative interpretation. Those measurements which satisfy the relation $|H_x|H_z|>0.1$ (for a Z-oriented transmitter system) are optimal for interpretation. Similarly, for an X-oriented transmitter system, the optimal relation is $|H_z/H_x|>0.1$. In an array of Z-directed and X-directed receivers, $H_x$ and $H_z$ components in this ratio are the measurements taken by those X- and Z-oriented receivers that are closest to each other in the array. A method of inversion can be used to interpret data with respect of formation parameters.

An increased transmitter-receiver spacing increases the signal of high-resolution X-component. Also, an increased spacing improves the ratio between two components, thereby enabling more practical measurements. Increasing spacing is dictated by the objective to azimuthally resolve and determine parameters of deep formation (deeper than 5 meters). In a formation model with a depth-to-boundary distance less than 5 meters, the set of Z-component measurements (transmitter is Z-oriented) taken in the 0–2 m spacings range during 1–100 μsec time interval is sufficient to solve the task of geo-steering. The sign of the X-component can be used to determine whether the boundary is located above or below the tool. In another embodiment, with an X-transmitter and Z, X-receivers, a transmitter-receiver spacing of less than 2 m is sufficient to resolve the formation.

Figure 10A:
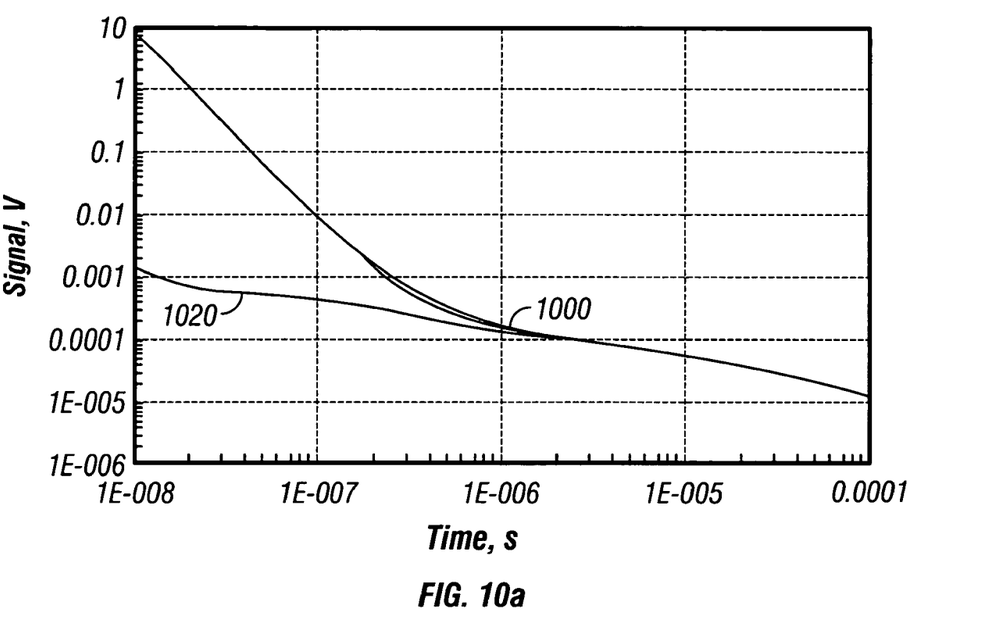
FIGS. 10A–B show an example of the use of a calibration signal for improving the resolution of signals for a Z oriented transmitter.
Figure 10B:
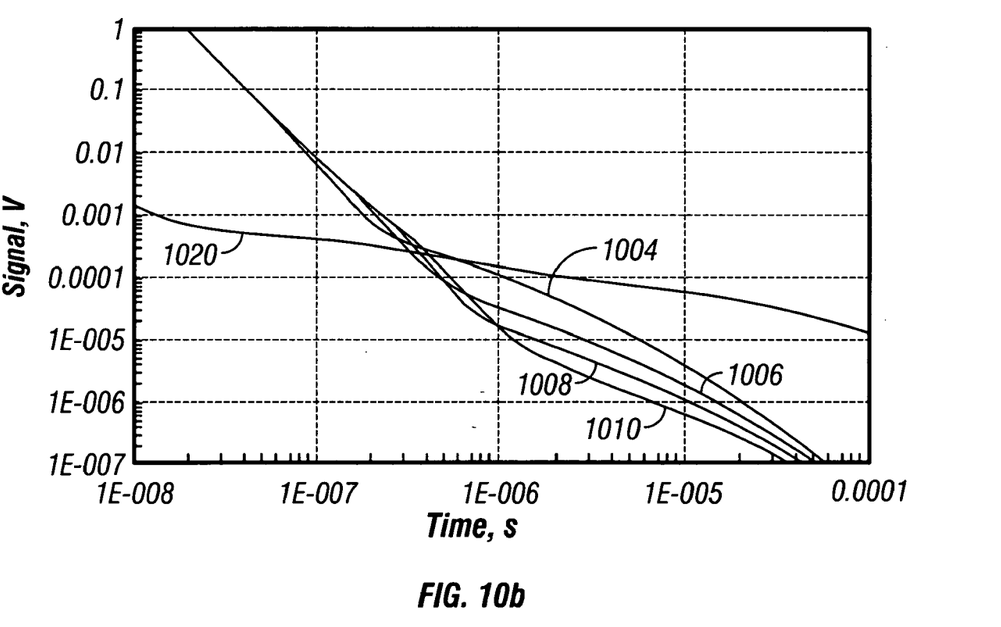

AS disclosed in co-pending U.S. patent application Ser. No. 10/746,071 ***filed on Dec. 24, 2003, one method of taking into account the metal housing is to use a reference signal. In FIG. 10A, signals are obtained at a depth-to-boundary of 4 m, 6 m, 8 m, end 10 in using a transmitter-receiver spacing of 0.5 m. As shown in FIG. 10A, the signals at these distances are early indistinguishable from one another. These curves are collectively labeled as 1000. An obtained signal due to a pipe outside a formation is shown in curve 1020. Differential signals obtained by subtracting pipe signal 1020 are shown in FIG. 10B. Curves for a depth-to-boundary sparing of 4 m, 6 m, 8 m, and 10 m are shown as 1004. 1006, 1008, and 1010** correspondingly. The resolution of the differential signals is clearly better than the resolution of the original signal.

Figure 11:
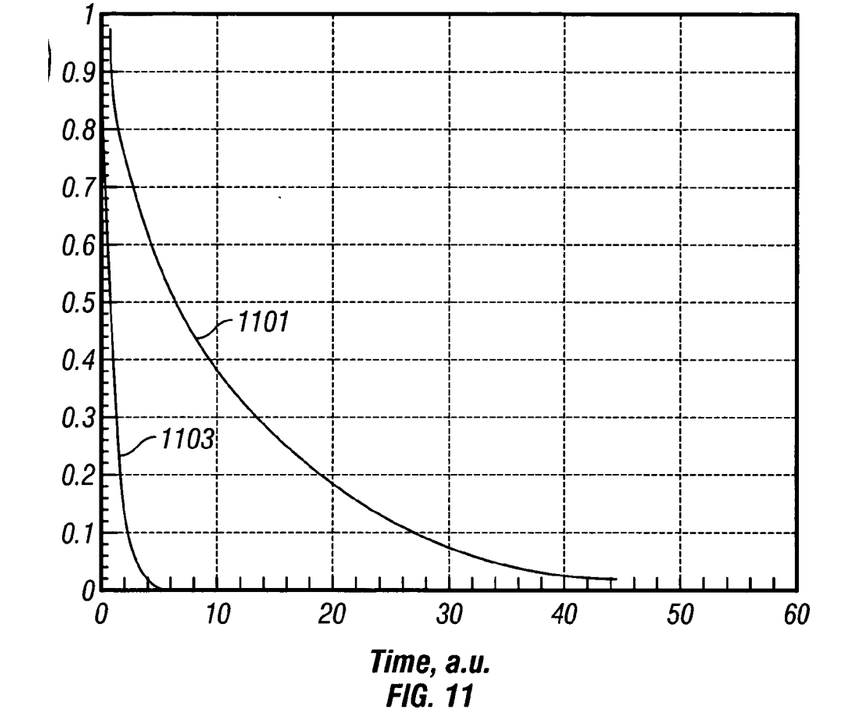
FIG. 11 illustrates the effect of the curs on the transient response of the tubular.

The effect of the cuts used in the present invention is qualitatively seen with reference to FIG. 11. The curve 1101 shows the response of the pipe to a transient signal in the absence of cuts. The curve 1103 shows the response of a pipe having cuts to a transient signal. Results such as these are obtained for different transmitter and receiver orientations and different orientations of the cuts.

Figure 12:
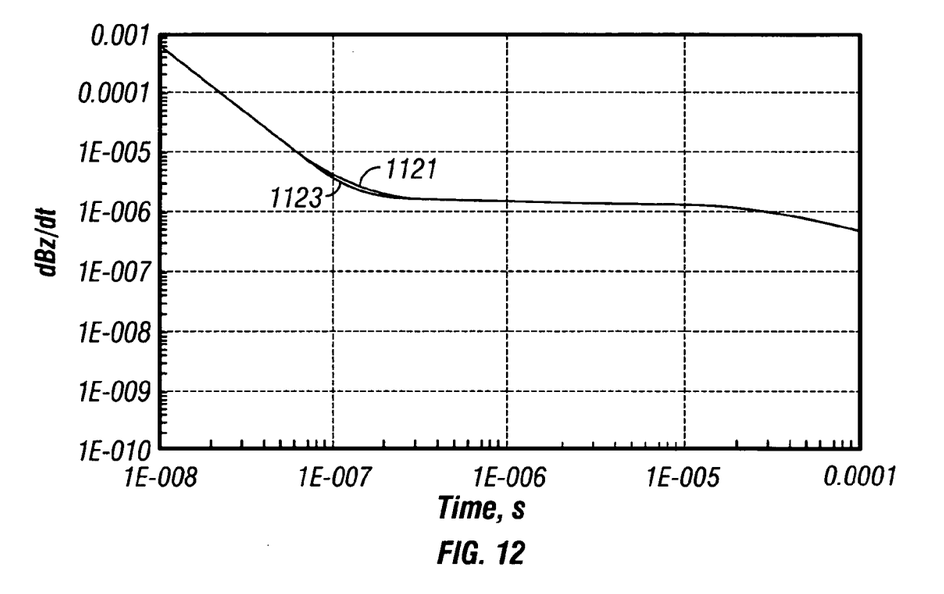
FIG. 12 shows transient signals for two different distances to an interface in an earth formation.
Figure 13:
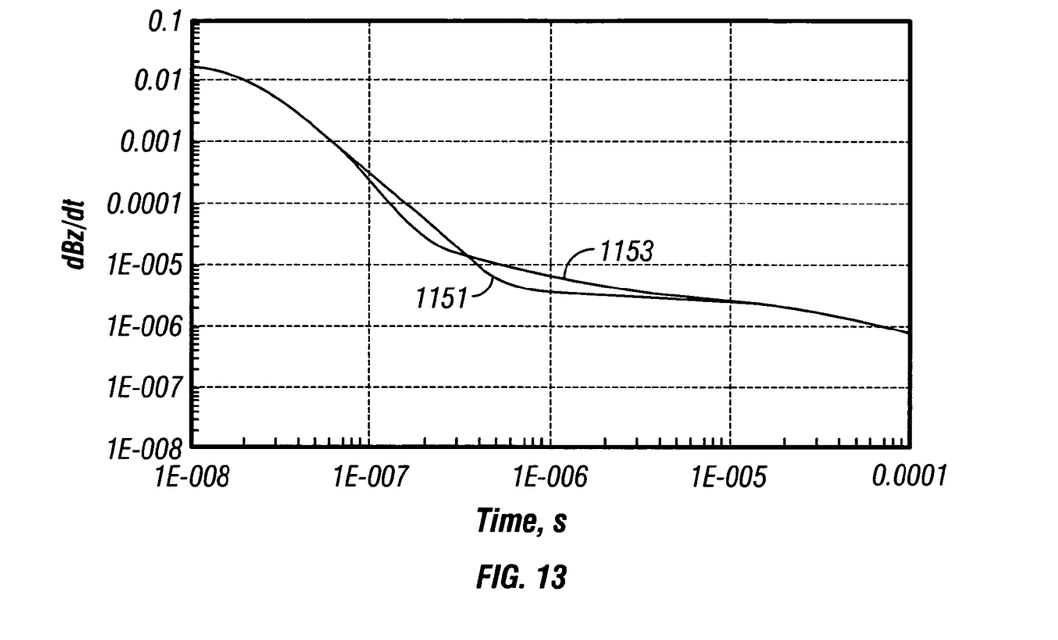
FIG. 13 shows the transient signals for the example of FIG. 12 with a ferrite cover of length 2 m.
Figure 14:
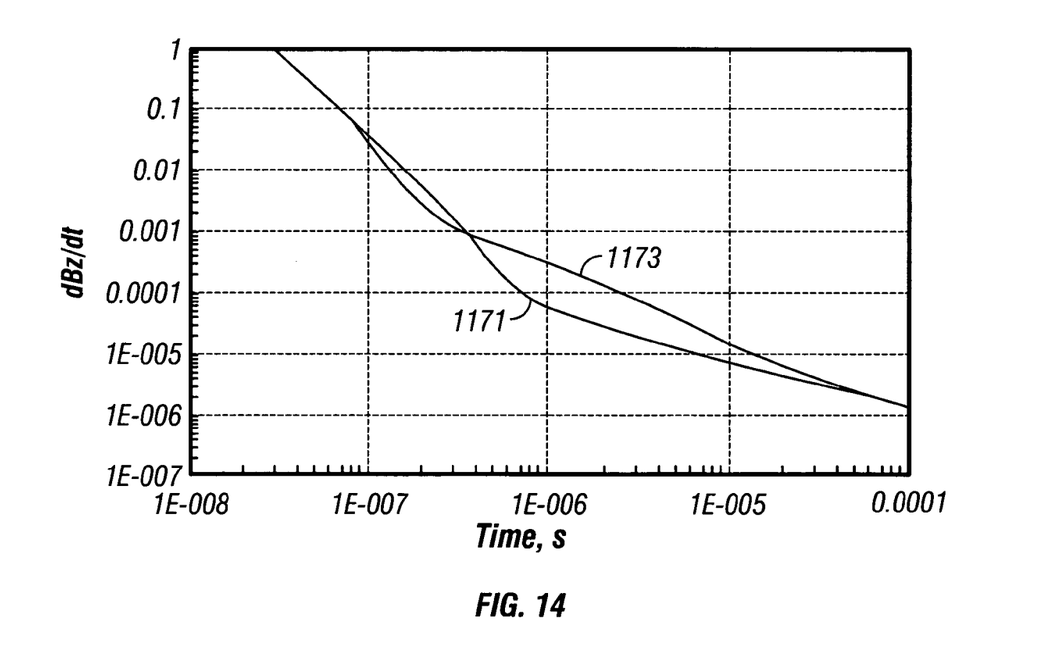
FIG. 14 shows transient signals for the example of FIG. 12 with a ferrite cover of length 4 m.

Next, the effects of using a non-conducting ferrite cover are discussed. In the modeling example, we use a cylindrical ferrite cover with a magnetic permeability of 100 and thickness of 0.5 cm. The permeability should preferably be greater than 100, but somewhat lower values could be used with less effectiveness. The ferrite is centered with respect to transmitter/receiver pair. The transmitter/receiver spacing is 0.5 m. We present modeling results for two cases of placement of water/oil boundary –4 and 8 m. The resolution criterion is the separation between two corresponding curves. FIG. 12 shows exemplary modeling results when no ferrite cover is used to suppress the eddy currents in the conductive pipe. 1121 is for the case when the distance is 8 m while 1123 shows the signal when the distance is 4 m. As we see from this figure the separation between signals is very small and practically is not resolvable. By using a 2 m ferrite cover results shown in FIG. 13 are obtained. The response for the 8 m distance is given by 1151 while the response for the 4 m distance is shown by 1153. As can be seen, the resolution if improved with respect to the results in FIG. 12. With a 3 m ferrite cover, the resolution is improved even further as seen by the curves 1171 (8 m distance) and 1173 (4 m distance).

The covering may be made of powdered soft magnetic material such as the commercially available or FLUXTROL™ iron powder materials and preferably comprises a ferromagnetic metal powder combined with an organic non-conductive binder, such as an epoxy resin. The particle size of the powder is small enough to appear transparent to the RF magnetic field. In the 0.5–1.0 MHz frequency range, the preferred non-ferrite soft magnetic material exhibits acceptable RF losses, thereby causing negligible deterioration of the antenna Q-factor. While FLUXTROL™ as commercially available has a permeability of around 50, it has the advantage of low magnetostriction and thus lower noise level. Such materials are discussed in co-pending U.S. patent application Ser. No. 10/177,618 of Kruspe et al., having the same assignee as the present application. Powdered metal materials like MPP (Molypermalloy Powder) that use a ceramic binder and offer permeabilities in excess of 100 may also be used.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. An apparatus for use in a borehole in an earth formation comprising:
    (a) a conducting tubular, said conducting tubular having a damping portion for reducing a flow of eddy currents;
    (b) at least one transmitter on said conducting tubular which propagates an electromagnetic field in the earth formation;
    (c) at least one receiver on said conducting tubular which receives a transient signal resulting from interaction of said electromagnetic field with said earth formation; and
    (d) a processor which determines from said transient signal a resistivity of said earth formation.

2. The apparatus of claim 1, wherein said damping portion further comprises at least one cut in said damping portion of said conducting tubular.

3. The apparatus of claim 2, wherein a non-conductive material is disposed within said cut.

4. The apparatus of claim 2 wherein said cut comprises a longitudinal cut.

5. The apparatus of claim 2 wherein said cut comprises a transverse out.

6. The apparatus of claim 1, wherein said damping portion further comprises:
    (i) a first segment having a cut, and
    (ii) a second segment with non-conductive material positioned on an outer face of said segment.

7. The apparatus of claim 1, wherein said damping portion further comprises a segment of pipe with a non-conductive material positioned on an outer face of said segment.

8. The apparatus of claim 1 wherein said damping portion comprises a ferrite.

9. The apparatus of claim 1 wherein said damping portion comprises a material with low magnetostriction.

10. The apparatus of claim 1, wherein said at least one transmitter further comprises at least one coil oriented so as to induce a magnetic moment in one of (i) a longitudinal direction parallel to an axis of said tubular, and, (ii) a direction inclined to said longitudinal axis.

11. The apparatus of claim 1, wherein said at least one receiver further comprises at least one coil having an orientation selected from (i) parallel to an axis of said tubular, and, (ii) inclined to an axis of said tubular.

12. The apparatus of claim 1 further comprising a device which extends said borehole.

13. The apparatus of claim 1 wherein said processor further determines a distance to a bed boundary in said earth formation.

14. The apparatus of claim 1 wherein said at least one transmitter and said at least one receiver are positioned on said conducting tubular on opposite sides of said damping portion.

15. A method of drilling an earth formation comprising:
   (a) conveying a bottom hole assembly (BHA) into said earth formation, said BHA including a tabular having a damping portion for reducing a flow of eddy currents;
   (b) using at least one transmitter on said tubular for producing an electromagnetic field in the earth formation;
   (c) using at least one receiver on said tubular for receiving a transient signal resulting from interaction of said electromagnetic field with said earth formation; and
   (d) determining from said transient signal a resistivity of said earth formation.

16. The method of claim 15, wherein said damping portion further comprises at least one cut.

17. The method of claim 16, wherein a non-conductive material is disposed within said cut.

18. The method of claim 16 wherein said cut comprises a longitudinal cut.

19. The method of claim 16 wherein said cut comprises a transverse cut.

20. The method of claim 15, wherein said damping portion further comprises:
   (i) a first segment having a cut, and
   (ii) a second segment with non-conductive material positioned on an outer face of said segment.

21. The method of claim 15, wherein said damping portion further comprises a segment of pipe with a non-conductive material positioned on an outer face of said segment.

22. The method of claim 21 further comprising using a ferrite for said non-conductive material.

23. The method of claim 21 further comprising using a material with low magnetostriction for said non-conductive material.

24. The method of claim 15, wherein said at least one transmitter further comprises at least one coil oriented so as to induce a magnetic moment in one of (i) a longitudinal direction parallel to an axis of said tubular, and, (ii) a direction inclined to said longitudinal axis.

25. The method of claim 15, wherein said at least one receiver further comprises at least one coil having an orientation selected from (i) parallel to an axis of said tubular, and, (ii) inclined to an axis of said tubular.

26. The method of claim 15 further comprising using a device on said BHA for extending said borehole.

27. The method of claim 15 further comprising determining a distance to an interface in said earth formation.

28. The method of claim 26 wherein (a)–(d) are carried out during continuing rotation of said BHA.

29. The method of claim 27 further comprising using said determined distance for controlling a drilling depth of said BHA.

30. The method of claim 27 wherein said interface comprises a bed boundary.

31. The method of claim 27 wherein said interface comprises a fluid interface.

32. The method of claim 15 further comprising positioning said at least one transmitter and said at least one receiver on opposite sides of said damping portion.

* * * * *